Feb. 19, 1946.     D. S. KELLOGG     2,395,000
ELECTRIC DRIVE
Filed April 3, 1943     3 Sheets-Sheet 2

INVENTOR.
Donald S. Kellogg
BY
Moses & Nolte
his ATTORNEYS

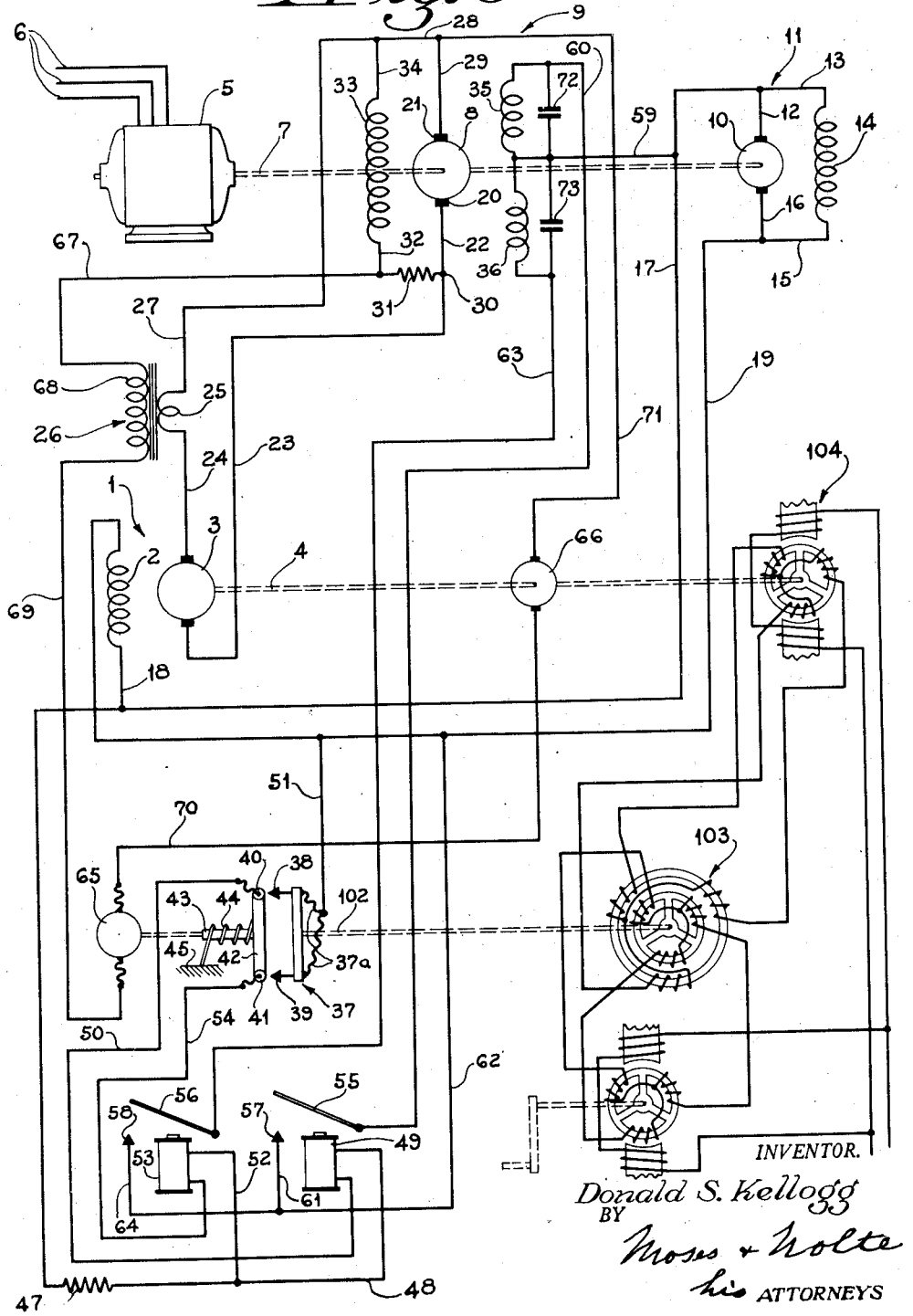

Patented Feb. 19, 1946

2,395,000

UNITED STATES PATENT OFFICE 2,395,000

ELECTRIC DRIVE

Donald S. Kellogg, Great Neck, N. Y., assignor, by mesne assignments, to The W. L. Maxson Corporation, New York, N. Y., a corporation of New York Application April 3, 1943, Serial No. 481,681

10 Claims. (Cl. 172—239)

This invention relates to an electric drive mechanism, and more particularly to adjustable speed electric drive mechanism capable under the influence of manual control, or of low power mechanical control, of producing any desired rotary speed of a high power output member between positive limits and between negative limits.

In one aspect the invention is in the nature of an improvement upon the invention disclosed and claimed in patent application Serial No. 473,800 of Peter J. McLaren, John A. Vaughan and Macon Fry, filed January 28, 1943, for Continuously adjustable speed electric drive. In said application disclosure is made of a double shunt power motor having oppositely effective field windings, a manual control member movable in either of two opposite directions from a neutral position to selectively influence the field circuits, speed responsive means operated by the power motor, and make and break mechanism responsive to the joint effect of the manual control member and the speed responsive means for affecting the field circuits of the motor and thereby causing the motor to assume and maintain a speed in either direction characteristic of, and dependent upon, the position of the manual control member.

In accordance with the present invention the same ultimate result may be obtained but through improved means. The field current of a power motor is maintained substantially constant and a generator for supplying armature current to the motor is controlled to vary the voltage applied to the motor armature. Provision is desirably made of a pair of generators, together with means for operating the generators at constant speed. One of these generators desirably develops a constant voltage which is supplied to the field of the power motor while the other generator, which is desirably of the self-shunt type, normally develops no voltage, but is controlled in such manner that it may be caused when rendered active to build up and apply a positive or negative voltage as desired across the armature of the power motor. The control of the generator for supplying armature current to the power motor is effected through make and break mechanism which is responsive jointly to a manual control member and to speed responsive means operated by the power motor. When the power motor has attained the speed characteristic of any selected position in which the manual control member may be held, the make and break mechanism, under the influence of the speed responsive means, acts upon the means for energizing the generator which supplies armature current to the motor to maintain the power motor substantially at that speed.

The direction of operation of the power motor depends upon the direction of displacement of the control member from a neutral position, and the speed of the power motor depends upon the extent of displacement of the control member from the neutral position. The speed of the power motor may be varied at will by shifting the control member.

In another aspect, the invention is in the nature of an improvement upon the invention disclosed and claimed in Patent No. 2,248,942 of William A. Black, granted July 15, 1941, for Power amplifier, and in Patent No. 2,300,626 of Peter J. McLaren, granted November 3, 1942, for Power amplifiers.

Each of the patents just referred to discloses hydraulic means for compelling a high power output member to conform substantially in direction and speed of operation to an extraneously operated low power control member.

In accordance with the present invention, the same kind of result is attained through electrical means. Such a result may advantageously be realized in accordance with the present invention by providing a power motor together with means for maintaining substantially constant the field current of the power motor and an armature current generator controlled to vary the armature current. A follow-up control member is made differentially responsive to the output of the power motor and to the input of a low power extraneously operated rotary control member for acting upon make and break mechanism to influence the generator which supplies armature current to the motor.

In accordance with the form of the invention now regarded as most advantageous, speed responsive means operated by the power motor cooperates with the follow-up control member to maintain the speed of the power motor in substantial conformity with the speed of the extraneously operated rotary control member.

In accordance with the present invention, the follow-up control member is desirably operated from the power motor and from the extraneously operated rotary control member through an electrical differential means, the electrical differential means being especially desirable for remote control purposes.

It is an object of the present invention to provide an improved manually controlled electric drive which is capable of producing controlled rotary output speed within limits in either of two opposite directions at the will of the operator.

It is a further important object of the invention to provide an electrical follow-up or power amplifier mechanism capable of producing high power rotary output in either direction in conformity with a low power rotary control member.

Other objects and advantages will hereinafter appear.

In the drawings forming part of this specification:

Figure 1a is a perspective view showing the control contacts in their physical relation to one another;

Fig. 3 is a diagrammatic view illustrating a further improved follow-up or power amplifier mechanism which fully embodies all the principles and advantages of combining the follow-up features of Fig. 2 with the speed control features of Fig. 1.

Figure 1:
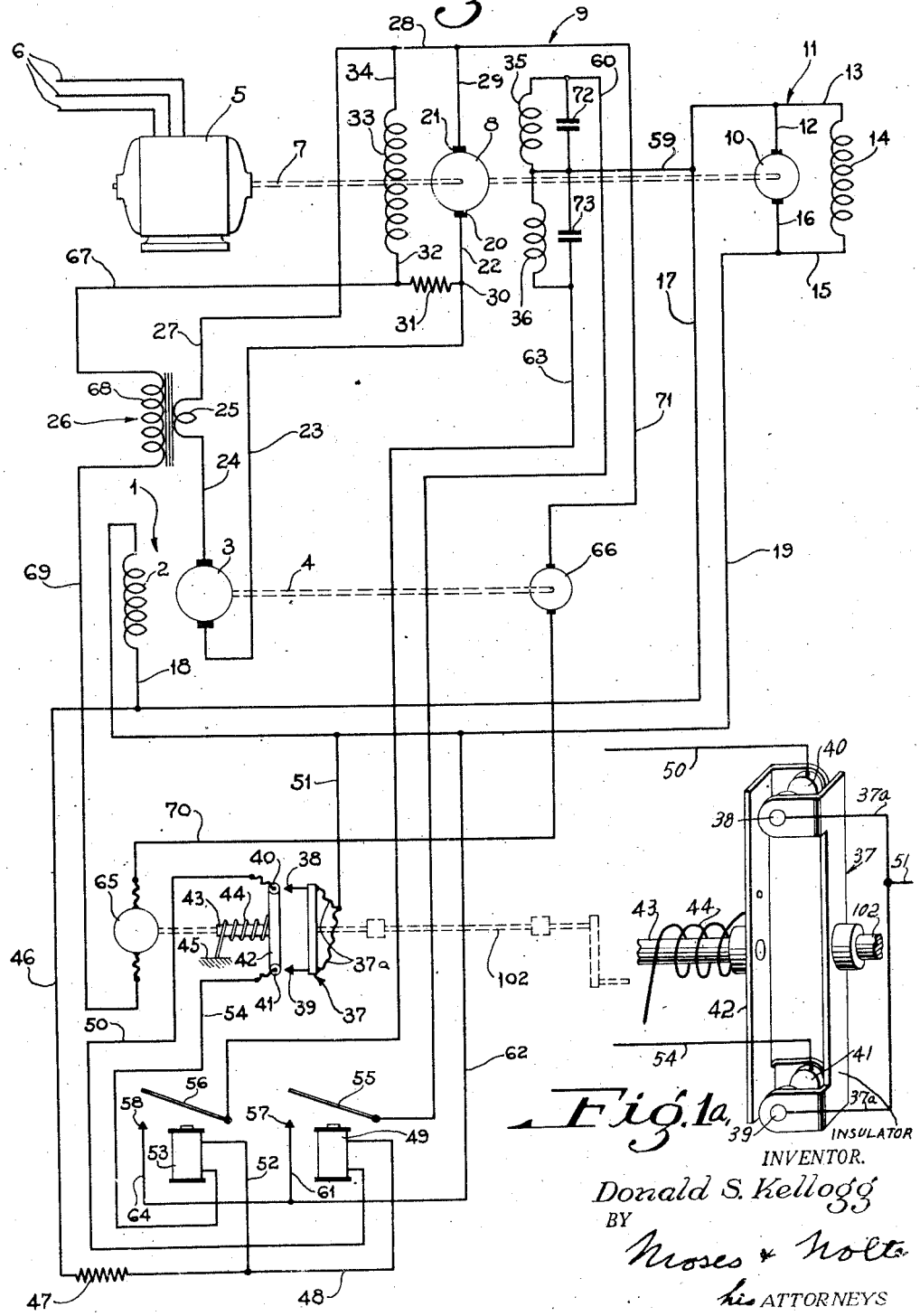
Fig. 1 is a diagrammatic view illustrating an improved electric drive which embodies features of the invention.

In accordance with the disclosure of Fig. 1, provision is made of a power motor 1 comprising a field winding 2, an armature 3, and an armature shaft 4. The purpose of the illustrated mechanism is to bring about rotary operation in either direction of the shaft 4 at a desired speed within limits, the speed being variable at the will of the operator.

Any suitable prime mover, such as an electric motor 5 energized and controlled through leads 6, is operated at constant speed to drive an output shaft 7 at constant speed. The shaft 7 drives the armature 8 of a direct current self-shunt generator 9 to supply regulated current to the armature 3 of motor 1. The shaft 7 also drives the armature 10 of a direct current self-shunt generator 11 which supplies current at constant voltage to the field winding 2 of the motor 1.

Current flows from armature 10 of generator 11 through conductors 12 and 13, shunt field winding 14, and thence through conductors 15 and 16 back to the armature. Current also flows from the armature 10 through conductors 17 and 18 to field winding 2 of power motor 1 and thence through conductors 19 and 16 back to the armature 10.

When the motor 5 is first started, the excitation of the generator 11 results at the start from the residual magnetism of shunt winding 14, but when the shaft 7 of motor 5 runs at its normal constant speed, the strength of the field circuit 14 attains a normal constant value and a constant voltage is applied across the field winding 2 of power motor 1.

The generator 9 normally applies no voltage across the armature 3 of power motor 1, but is adapted at the will of the operator to generate voltage for transmitting current through the armature 3 of power motor 1 in either direction and thereby to produce output operation of the motor shaft 4 in either direction desired. The control means whereby this kind of result is secured will be described presently.

Assuming that a voltage is being generated by the generator 9 which makes the lower brush 20 the positive terminal and the upper brush 21 the negative terminal, current will flow through conductors 22 and 23 to the armature 3 and thence through a conductor 24, a primary winding 25 of a transformer 26 and through conductors 27, 28 and 29 back to the armature 8.

The current flowing from the armature through 22 divides at 30, a portion flowing through a fixed resistor 31, a conductor 32, to a field winding 33, and thence through a conductor 34 and conductors 28 and 29 back to the armature 8.

In the case of either of the circuits just traced out, if the polarity is reversed, the direction of current flow will be reversed, but the circuit paths will be the same. The same thing holds true for other output circuits of the armature 8, and hence the assumption that the brushes 20 is the positive terminal of the armature will be adhered to for purposes of explanation unless the contrary is stated.

The generator 9 normally develops no voltage, unless one or the other of a pair of opposite pilot field windings 35 and 36 is energized. Control means are provided for selectively energizing the pilot field windings 35 and 36. When the pilot field winding 35 is energized, the resultant generated current flows from the armature 8 through shunt field 33 in one direction to aid the pilot field winding 35, and when the pilot field winding 36 is energized the generated current flows from the armature 8 through shunt field winding 33 in the opposite direction to aid pilot field winding 36. Thus, the energization of pilot field winding 35 causes a voltage to be built up and applied through the armature 3 of power motor 1 in one direction, while the energization of pilot field winding 36 causes a voltage to be built up and applied to armature 3 of power motor 1 in the opposite direction. The pilot field windings 35 and 36 are also inherently inductively coupled to the field 33 and thus the energization of the pilot field winding 35 causes a voltage to be built up and applied through the field 33 in one direction while the energization of the pilot field winding 36 causes a voltage to be built up and applied through the field 33 in the opposite direction.

It will be noted that rotation of the armature 3 begins as soon as any voltage is applied across the armature and that the speed of rotation of the armature 3 is increasing as the voltage generated by generator 9 is being developed to its maximum value. The increasing speed of armature 3 produces an increasing counter-electromotive force in the armature circuit. The design may advantageously be such that the speed of armature 3 is sufficient at any instant in relation to the simultaneously generated and applied voltage to protect the armature 3 against destructive current flow.

The energization of the pilot fields 35 and 36 is selectively controlled by control mechanism now to be described which includes a manual control member 37.

The manual control member 37 carries a pair of contacts 38 and 39 which are cooperative, respectively, with contacts 40 and 41. The contacts 40 and 41 are carried by an arm 42 which is made fast upon a shaft 43 and is normally biased to a neutral position by a coil spring 44. The spring 44 surrounds the shaft 43, being connected at one end to the arm 42 and at the opposite end to a stationary frame member 45.

The pairs of contacts 38—40 and 39—41 are adapted to be selectively engaged by movement of the control member 37 in opposite directions from a neutral position to connect them in circuit with the armature 10 of generator 11. The generator 11, it will be remembered, has a constant voltage output so long as the shaft 7 of the motor 5 is running at its normal constant speed. Closing of contact 38 onto contact 40 completes a circuit which comprises the armature 10, conductors 12 and 17, a conductor 46, which includes a fixed resistor 47, a conductor 48, the winding of a relay 49, a conductor 50, contacts 40 and 38, conductor 37a, conductor 51 and conductors 19 and 16. This energizes relay 49. Closing of contact 39 against contact 41 completes a circuit which includes armature 10, conductors 12, 17 and 46, a conductor 52, the winding of a relay 53, a conductor 54, contacts 41 and 39, conductor 37a, and conductors 51, 19 and 16. This energizes relay 53.

The pilot field windings 35 and 36 of generator 9 are controlled, respectively, through switch arms 55 and 56 which are responsive, respectively, to relays 49 and 53. When relay 49 is energized, switch arm 55 is drawn down into engagement with a contact 57. When relay 53 is energized, switch arm 56 is drawn down into engagement with a contact 58. When either relay is deenergized, the associated switch arm is returned to and maintained in the elevated position illustrated in Fig. 1.

When switch arm 55 is drawn into engagement with contact 57 by relay 49, a circuit is established from armature 10 of generator 11 through conductors 12 and 17, thence through conductor 59, pilot field winding 35, conductor 60, switch arm 55, contact 57, conductors 61 and 62, and thence through conductors 19 and 16 to armature 10. This energizes pilot field winding 35 from generator 11. When switch arm 56 is closed upon contact 58, a circuit is established from armature 10 of generator 11 through conductors 12, 17 and 59, field winding 36, conductor 63, switch arm 56, contact 58, conductor 64, and thence through conductors 62, 19 and 16 to armature 10. This energizes pilot field winding 36 from generator 11.

From what has just been said, it is evident that pilot field winding 35 is energized whenever contact 38 is closed on contact 40, and that pilot field winding 36 is energized whenever contact 39 is closed on contact 41. Thus operation of the manual control member 37 to close contact 38 on contact 40 causes the armature 3 of power motor 1 to rotate in one direction, and operation of the manual control member 37 to close contact 39 on contact 41 causes the armature 3 of power motor 1 to rotate in the opposite direction.

When the armature 3 of power motor 1 is set into operation in either direction, the armature will gain speed until a speed is attained which is characteristic of the position to which the manual control member 37 has been moved.

Taking the case in which the manual member has been operated to engage contact 38 with contact 40 as an example, the contact 38 has not merely been moved into engagement with the contact 40, but has displaced the contact 40 together with its supporting arm 42 a definite amount, depending upon the extent to which the manual control member 37 has been moved away from the neutral position. This deforms the spring 44, so that the spring tends to return contact 40 to its initial position with a force whose value is dependent upon the extent of displacement of the contact 40 from that position.

The shaft 43 upon which the arm 42 is made fast is the output shaft of a torque motor or galvanometer 65. The output shaft 4 of power motor 1, whose speed it is desired to control, drives a generator 66 whose voltage output is a function of the speed of the shaft 4. By connecting the generator 66 in series with the torque motor 65, the torque motor 65 is caused to apply a torque to shaft 43 in opposition to the torque exerted upon the shaft by the spring 44. When the torque applied by torque motor 65 is sufficient to overcome the torque applied by the spring 44, contact 40 is moved out of engagement with contact 38 even though contact 38 be retained stationary in the position to which it has been moved by manual control member 37.

When such disengagement occurs, the relay 49 is deenergized, switch arm 55 moves out of engagement with contact 57, deenergizing pilot field 35, the output voltage of generator 9 diminishes, and armature 3 of power motor 1 loses speed. This, however, results in a slowing down of generator 66 and in a reduction of the torque exerted by torque motor 65 upon shaft 43 and, therefore, permits the spring 44 to move contact 40 back into engagement with contact 38 so that the drive is reestablished.

So long as the contact 38 is not moved to a new position, contact 40 will move into and out of engagement with 38 in rapid alternation, leaving engagement with 38 as soon as the speed of shaft 4 exceeds the speed characteristic of the position in which the manual control member is held, and reengaging 38 as soon as the speed of shaft 4 falls below the speed characteristic of the position in which manual control member 37 is held. Moving the manual control member 37 to a new position readjusts the torque applied by the spring 44 and causes the shaft 4 to assume and maintain a new speed characteristic of the new position of the manual control member 37.

In line with the discussion thus far given, the control described could be effected simply by connecting generator 66 in series with torque motor 65. It will be noted, however, that the closing and opening of a pair of contacts 38—40 or 39—41 must energize or deenergize a relay, which in turn closes or opens a switch for energizing one or the other of the pilot fields 35, 36, that the energized pilot field must gradually build up current in the shunt circuit field 33 of generator 9, that the current developed by generator 9 must become effective with respect to rotation of the shaft 4, and finally that the shaft 4 must influence shaft 43 through generator 66 and torque motor 65. When contact is broken, the reverse train of events must occur through the same train of elements, so that the same lag factors are present.

It has been found that the desired control can be effected with less lag, and more smoothly, if the torque motor 65 is controlled in part directly from the generator 9. An increase of generator voltage will find a direct, although perhaps somewhat delayed, response in an increased speed of the shaft 4, and hence the element of control contributed to the torque motor 65 by the generator 9 is consistent with the element of control contributed by the generator 66, but tends to anticipate a little, and hence to make the speed responsive control contacts more promptly effective and to hold the speed of the shaft 4 more nearly to the intended average speed.

The field 33 of generator 9 is, therefore, connected in series with the generator 66, the circuit being traced out in one direction from the field 33 of generator 9 through conductors 32 and 67, secondary winding 68 of transformer 26, conductor 69, torque motor 65, conductor 70, generator 66, and conductors 71, 28 and 34 back to the field 33 of generator 9.

The purpose of the transformer 26 is also to make the contact control mechanism more promptly responsive than it would otherwise be. It will be noted that transformer winding 68 has more turns than transformer winding 25, and hence that the voltage induced from the primary into the secondary is relatively high as compared with the voltage induced from the secondary into the primary of the transformer 26. While changes of voltage in the secondary have relatively little effect upon the primary circuit, changes of voltage in the primary have relatively large effect upon the voltage of the secondary circuit.

When one of the pairs of contacts 38—40 or 39—41 is first engaged, the primary voltage builds up rapidly and a considerable voltage is induced in the secondary. Unless the control member 37 has been set for a very low speed, however, the torque motor 65 will be ineffective to open the engaged contacts. As the output voltage of generator 9 increases current flow through the primary 25 increases, but since the counter-electromotive force of the power motor 1 is increasing, the rate of increase of current flow through the primary 25 diminishes and the induced voltage in secondary 68 falls off, the torque motor finally breaking engagement of the active contacts in response to the voltage generated by generators 9 and 66 with only relatively minor assistance from the voltage developed in the secondary 68 of the transformer 26.

When the active contacts are thus disengaged, however, the current flow through the primary 25 diminishes and the voltage induced in secondary 68 passes through zero and becomes of opposite sign now opposing rather than aiding the voltage directly delivered by the generators 9 and 66 to the torque motor 65. Since the voltages delivered to the torque motor 65 by the generators 9 and 66 are diminishing at the same time (because pilot field 35 is open-circuited and generator 66 is slowing down), and since the induced voltage is opposing the diminishing generated voltage delivered to the torque motor, the reengagement of the active contacts is effected more promptly than would be the case if the transformer 26 were not present. When now the contacts are reengaged with the motor running just below the desired average speed, the current flow through the primary 25 is increased, the induced voltage in secondary 68 again aids the increasing voltage directly applied to the torque motor 65 by generators 9 and 66, and as the shaft 4 gains speed the active contacts are disengaged more promptly than they would be if the transformer 26 were not present. The control contacts, when the torque motor 65 is controlled by the combination of the three voltage sources described, namely, generator 9, generator 66, and transformer 26, make and break the control circuit in very rapid alternation and produce a very fine and accurate control.

It is not necessary to the operativeness of the invention, however, that all three of the voltage sources be combined for controlling the torque motor 65, since any one of the three voltage sources, namely, generator 9, generator 66 or transformer 26 may be used without the others or any two of them may be used in combination but without the third to effect a practical and advantageous control.

It will be noted that the torque motor gradually overcomes the torque of spring 44 so that contacts 38—40 or 39—41 are not sharply disengaged and are not separated very widely at any time. It is for this reason, as clearly brought out in pending application, Serial No. 473,318, filed January 23, 1943, for Electric drive, of Wallace A. Lauder, that the contacts 38—40 and 39—41 are employed merely for energizing low voltage relays 49 and 53, and that relay control switches 55 and 56 are provided in the circuits which actually include the pilot fields 35 and 36. This feature is claimed in Serial No. 473,318.

A fixed resistor 47 in series with both the relays 49 and 53 limits the voltage available at the contacts 38—40 and 39—41 and thereby prevents objectionable arcing. A condenser 72 is connected between conductors 59 and 60, and a condenser 73 is connected between conductors 59 and 63, these condensers being provided in the circuits of the respective pilot field windings 35 and 36 for the purpose of suppressing arcing in these circuits.

In the form of the invention diagrammatically illustrated in Fig. 2 the parts illustrated in common with Fig. 1 are the same as those described in connection with Fig. 1, and hence the same reference characters have been applied to corresponding parts and no detailed description will be given of such parts.

It should be noted, however, that the torque motor 65 is omitted and that the circuit elements for applying voltage to the torque motor 65 from all three of the voltage sources illustrated in Fig. 1 are omitted, there being no generator 66, no transformer 26, and no connections from the generator 9 to the torque motor 65.

Figure 2:
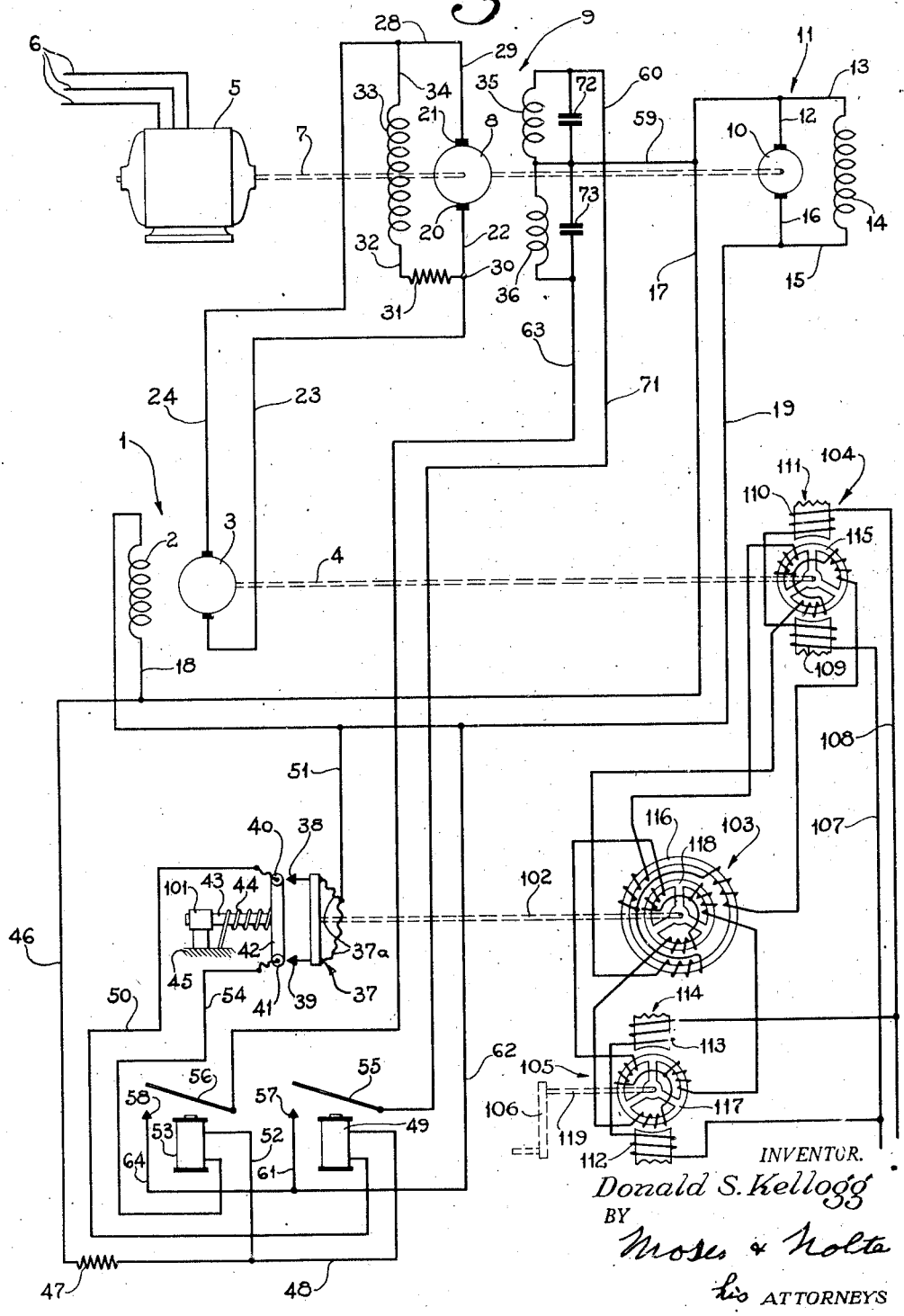
Fig. 2 is a diagrammatic view illustrating an improved follow-up or power amplifier mechanism which is adapted for remote control.

The mechanism of Fig. 2 is designed to make the output of power motor shaft 4 conform in direction of operation, substantially in speed of operation, and substantially in extent of operation to the direction, speed and extent of operation of a low torque rotary control member which may be located at a remote point. The direction, speed and extent of operation of shaft 4 may be different from the direction, speed and extent of operation of the lower torque control member, but conformity requires only that a uniform law of relationship be maintained.

The shaft 43, instead of being the output member of the torque motor 65, is simply mounted with freedom for rotation in a stationary bearing member 101, subject to the restraint of spring 44. The member 37 is made fast on a shaft 102 which is driven from an alternating current, self-synchronous differential 103.

An alternating current, self-synchronous transmitter 104 is driven by the output shaft 4 of power motor 1 and connected to the differential 103. A similar low torque control transmitter 105 is operated manually as by a crank 106, or in any other desired manner, at a remote point and is connected to the differential 103.

Self-synchronous transmitters and self-synchronous differentials are well known per se, the illustrative devices being of the type manufactured and sold by the General Electric Company under the name of "Selsyn."

Conductors 107 and 108, connected to a source of alternating current (not illustrated) are connected through single phase primary windings 109 and 110 of the stator 111 of transmitter 104. The conductors 107 and 108 are also connected through single phase primary windings 112 and 113 of the stator 114 of transmitter 105. A rotor ring 115 of transmitter 104 is fast upon the shaft 4 and is mechanically driven by the shaft. Each rotor 115 carries three identical and equally spaced windings. These windings are connected to one another and they are connected respectively to three correspondingly spaced and correspondingly located windings upon a stator ring 116 of differential 103. The latter windings are connected to one another through a common point. Similarly, a rotor ring 117 of transmitter 105 has three identical and equally spaced windings. These windings are connected to one another and they are connected respectively to three correspondingly spaced and correspondingly located windings upon a rotor ring 118 of the differential 103. The latter windings are connected to one another through a common point. The rotor ring 118 is fast upon the shaft 102 and drives the shaft 102.

The effective operation of the transmitters 104 and 105 and the differential 103 is precisely the same as the operation of a mechanical differential gear in which the input arms correspond to rotors 115 and 117 and the output arm corresponds to rotor 118, the extent of operation of the output arm being equal to the difference of operation of the input gears. The extent of operation of the shaft 102 is, therefore, equal to the difference of the extent of operation of the shaft 4 and the shaft 119 upon which the rotor 117 is fixedly mounted.

In the beginning the motor shaft 4 is stationary and locks transmitter 104 stationary, so that there is no transmission from the transmitter 104 to differential 103. The input from the remote, low torque, control transmitter 105 operates, therefore, with full effect upon shaft 102. This produces engagement of one of the pairs of contacts 38—40 or 39—41, say the former pair, and causes the power motor 1 to set the shaft 4 into operation and, in turn, causes the transmitter 104 to transmit electrical impulses to the differential 103. The impulses thus transmitted by 104 are applied to the differential 103 in the opposite sense from those transmitted by the low torque remote control transmitter, but until the shaft 4 has acquired the speed of the remote control transmitter, or a predetermined relationship to the speed of the remote control transmitter, the influence of the remote control transmitter will exceed the influence of the transmitter 104 and the contacts 43—39 will be displaced farther and farther away from their initial positions against a progressively increasing torque of the spring 44.

As soon as the speed of the shaft 4 exceeds that of the remote control transmitter, the contacts 38 and 39 will tend to return toward their initial positions and the spring 44 will cause the contact 40 to follow the contact 38.

When the contact 40 has been restored by the spring 44 to its initial position, any further recession of the contact 38 breaks engagement between 40 and 38. The power motor 1 thereupon begins to slow down with the consequence that the influence of the transmitter 104 upon the differential 103 is diminished. If the operation of the remote control transmitter is continued at uniform speed the remote control transmitter will again very quickly regain its ascendency over the transmitter 104 and engagement between contacts 38 and 40 will be reestablished.

The making and breaking of engagement between contacts 38 and 40 will occur in rapid alternation, thereby maintaining the speed of shaft 4 at the same average speed as the remote control transmitter, subject to slight and rapid fluctuations above and below the average speed.

Should the transmitter 104 so far overrun the remote control transmitter as to cause not only disengagement of contacts 38 and 40 but the engagement of contacts 39 and 41, the circuit will be established which tends normally to drive the power motor 1 in the opposite direction from that in which it is running, with the consequence that the power motor 1 will be very quickly slowed down, the engagement of 41 with 39 will be very quickly broken, and the normal operation already described will be resumed. When the remote control transmitter is brought to rest the motor 1 will slow down substantially in conformity with it and will come to rest after having substantially conformed in the extent of its operation to the extent of operation of the low torque remote control transmitter.

Operation of the low torque remote control transmitter in the opposite direction will produce exactly the same kind of operation of the power motor 1 and the control contacts as that which has just been described, but the rotation of the power motor will be in the opposite direction, and instead of the contacts 38 and 40 being the active contacts, the contacts 39 and 41 will be the active contacts.

In Fig. 3 disclosure is made of a follow-up or power amplifier mechanism which combines the features of Figs. 1 and 2. All of the parts illustrated in Fig. 3 are illustrated either in Fig. 1 or in Fig. 2, and hence corresponding reference numerals have been applied and no further detailed description will be given.

It is to be noted, however, that the torque motor control 65 is combined with the follow-up control of differential 103, the shaft 43 being the output shaft of the torque motor 65 as in Fig. 1.

This arrangement constitutes a definite improvement upon the arrangement disclosed in Fig. 2, since it results in a smoother and more uniform conformity of the speed of shaft 4 to the speed of the low torque remote control transmitter.

When, through initial operation of the remote control transmitter the contact 38 is moved to displace the contact 40 against the torque of spring 44, power motor 1 is set into operation. This, besides exerting the influence through transmitter 104 upon differential 103 which has been already described, causes voltage to be transmitted to the torque motor 65 from generators 9 and 66 and transformer 26 in the manner described in connection with Fig. 1.

The torque motor 65 applies a torque which at first compensates in part the torque of spring 44. Now, when the speed of shaft 4 exceeds that of the remote control transmitter, and the contact 38 starts to return toward initial position, the contact 40 does not follow the contact 38 all the way to the original position of contact 40, because it is arrested and thereby caused to break engagement with 38 in the position in which torque motor 65 exactly balances spring 44. Power motor 1 thereupon starts to slow down so that contact 38 is caused through the differential action to be carried back toward engagement with contact 40. At the same time the torque exerted by torque motor 65 begins to diminish so that contact 40 moves toward engagement with contact 38 under the influence of spring 44. The result is that the contacts are very quickly reengaged in response to a very slight slowing down, and that they continue to be engaged and reengaged in rapid alternation with the contact 40 maintaining substantially the average position determined by the average speed of the shaft 4. The response is substantially more prompt, and as a consequence the operation of shaft 4 is substantially smoother when an arrangement like that of Fig. 3 is employed than when an arrangement like that of Fig. 2 is employed.

As in the instance of the structures previously described in connection with Fig. 1 and Fig. 2, the principle of operation is the same in either direction.

I have described what I believe to be the best embodiments of my invention. I do not wish, however, to be confined to the embodiments shown, but what I desire to secure by Letters Patent is set forth in the appended claims.

I claim:

1. In an electric drive, the combination with a power motor, of means for continuously supplying field current to the motor, a generator connected to supply armature current to the motor but normally having no output, said generator including an armature, a main field in shunt with the armature through a resistor, and a pair of pilot fields of opposite effect inductively coupled to the main field, means for driving the generator, manually operated control means for selectively exciting the pilot fields to cause the generator to build up and apply voltage in one direction or the other across the motor armature, and speed responsive means operated by the motor and operative upon the generator exciting means for interrupting excitation of the generator when the motor speed exceeds a predetermined value characteristic of the position of the manually operated control means and for reestablishing excitation of the generator when the motor speed falls below such value.

2. In an electric drive, the combination with a power motor, of means for continuously supplying field current to the motor, a generator connected to supply armature current to the motor but normally having no output, said generator including an armature, a main field in shunt with the armature through a resistor, and a pair of pilot fields of opposite effect inductively coupled to the main field, means for driving the generator, means for causing excitation of the pilot fields to make the generator effective to generate output voltage, a low torque control member, and differential mechanism differentially responsive to operation of the motor and operation of the low torque control member and operative upon the generator exciting means for controlling the starting and stopping of pilot field excitation in accordance with the difference of extent of operation of the low torque control member and the power motor.

3. In an electric drive, the combination with a power motor, of means for continuously supplying field current to the motor, a generator connected to supply armature current to the motor, but normally having no output, said generator including an armature, a main field in shunt with the armature through a resistor, and a pair of pilot fields of opposite effect inductively coupled to the main field, means for driving the generator, means for selectively exciting the pilot fields to cause the generator to build up and apply voltage in one direction or the other across the power motor armature, a low torque control member, and differential mechanism differentially responsive to operation of the motor and operation of the low torque control member and operative upon the pilot field exciting means for controlling and starting and stopping of generator excitation in accordance with the difference of extent of operation of the low torque control member and the power motor.

4. In an electric drive, the combination with a power motor, of means for continuously supplying field current to the motor, a generator connected to supply armature current to the motor but normally having no output, said generator including an armature, a main field in shunt with the armature through a resistor, and a pair of pilot fields of opposite effect inductively coupled to the main field, means for driving the generator, means for exciting the pilot fields to make the generator effective to generate output voltage, a low torque control member, differential mechanism differentially responsive to operation of the motor and operation of the low torque control member, speed responsive means operated by the motor, and contact means responsive jointly to the differential mechanism and to the speed responsive means and operative upon the pilot field exciting means to control the generator output voltage and thereby to cause the motor to conform in speed and substantially in phase to the operation of the low torque control member.

5. In an electric drive, the combination with a power motor, of means for continuously supplying field current to the motor, a generator connected to supply armature current to the motor but normally having no output, said generator including an armature, a main field in shunt with the armature through a resistor, and a pair of pilot fields of opposite effect inductively coupled to the main field, means for driving the generator, means for selectively exciting the pilot fields to cause the generator to build up and apply voltage in one direction or the other across the motor armature, a low torque control member, differential mechanism differentially responsive to operation of the motor and operation of the low torque control member, speed responsive means operated by the motor, and contact means responsive jointly to the differential mechanism and to the speed responsive means and operative upon the pilot field exciting means to control the generator output and thereby to cause the motor to conform in direction, speed and substantially in phase to the operation of the low torque control member.

6. In an electric drive, the combination with a power motor, of means for continuously supplying field current to the motor, a generator connected to supply armature current to the motor, but normally having no output, said generator including an armature, a main field in shunt with the armature through a resistor, and a pair of pilot fields of opposite effect inductively coupled to the main field, means for driving the generator, means for exciting the pilot fields to cause the generator to build up and apply voltage across the motor armature, an extraneously operable control member, and contact means responsive in part to the operation of the motor and in part to operation of the extraneously operable control member and operative upon the pilot field exciting means to control the generator output and thereby to control the motor operation.

7. In an electric drive, the combination with a power motor, of a first constant voltage generator for supplying substantially constant field current to the motor, a second generator for building up and supplying armature current to the motor but normally having no output, means for driving said generators at substantially constant speed, said second generator having a self-shunt field and a pair of pilot fields of opposite effect inductively coupled therewith, circuit means for connecting the first generator to excite said pilot fields alternatively, an extraneously operable control member, speed responsive means operated by the motor, and contact means responsive in part to said speed responsive means and in part to the operation of the extraneously operable control member and operative upon the pilot field circuit means to control the output of the second generator and thereby to control the motor operation.

8. In an electric drive, the combination with a power motor, of means for continuously supplying field current to the motor, a first generator for building up and supplying armature current to the motor, but normally having no output, said generator including an armature, a main field in shunt with the armature through a resistor, and a pair of pilot fields of opposite effect inductively coupled to the main field, means for driving the generator, a torque motor, a contact carrying control member operable thereby, a second cooperative contact carrying control member operable to effect engagement of contacts carried by the respective control members and to displace the first control member, spring means responsive to such displacement to maintain the contacts in engagement with one another with a bias whose value is a function of the extent of displacement, means for supplying a voltage to the torque motor for producing a torque in opposition to said bias for operating the first control member to disengage said contacts when the bias is overcome, comprising a second generator, operated by the power motor, and means responsive to said contacts for controlling the excitation of the first generator and for thereby controlling the operation of the motor.

9. In an electric drive, the combination with a power motor, of means for continuously supplying field current to the motor, a generator for building up and supplying armature current to the motor, but normally having no output, said generator including an armature, a main field in shunt with the armature through a resistor, and a pair of pilot fields of opposite effect inductively coupled to the main field, means for driving the generator, a torque motor, a contact carrying control member operable thereby, a second cooperative contact carrying control member operable to effect engagement of contacts carried by the respective control members and to displace the first control member, spring means responsive to such displacement to maintain the contacts in engagement with one another with a bias whose value is a function of the extent of displacement, means for supplying a voltage to the torque motor for producing a torque in opposition to said bias for operating the first control member to disengage said contacts when the bias is overcome, comprising the main field of said generator, and means responsive to said contacts for controlling the excitation of said generator and for thereby controlling the operation of the motor.

10. In an electric drive, the combination with a power motor, of means for continuously supplying field current to the motor, a first generator for building up and supplying armature current to the motor, but normally having no output, means for driving the generator, a torque motor, a contact carrying control member operable thereby, a second cooperative contact carrying control member operable to effect engagement of contacts carried by the respective control members and to displace the first control member, spring means responsive to such displacement to maintain the contacts in engagement with one another with a bias whose value is a function of the extent of displacement, means for supplying a voltage to the torque motor for producing a torque in opposition to said bias for operating the first control member to disengage said contacts when the bias is overcome, comprising the field of the first generator, a second generator operated by the motor, and a transformer having its primary winding in series with the armature of the first generator, and means connecting the field of the first generator, the armature of the second generator and the secondary winding of the transformer in series with the torque motor, and means responsive to closing and opening of said contacts for starting and stopping excitation of the first generator and for thereby controlling the operation of the motor.

DONALD S. KELLOGG.

---

Certificate of Correction

Patent No. 2,395,000.                                February 19, 1946.

DONALD S. KELLOGG

It is hereby certified that error appears in the printed specification of the above numbered patent requiring correction as follows: Page 6, second column, line 3, claim 3, for "and starting" read *the starting*; and that the said Letters Patent should be read with this correction therein that the same may conform to the record of the case in the Patent Office.

Signed and sealed this 30th day of April, A. D. 1946.

[SEAL]

LESLIE FRAZER,
*First Assistant Commissioner of Patents.*